Patented Mar. 14, 1950

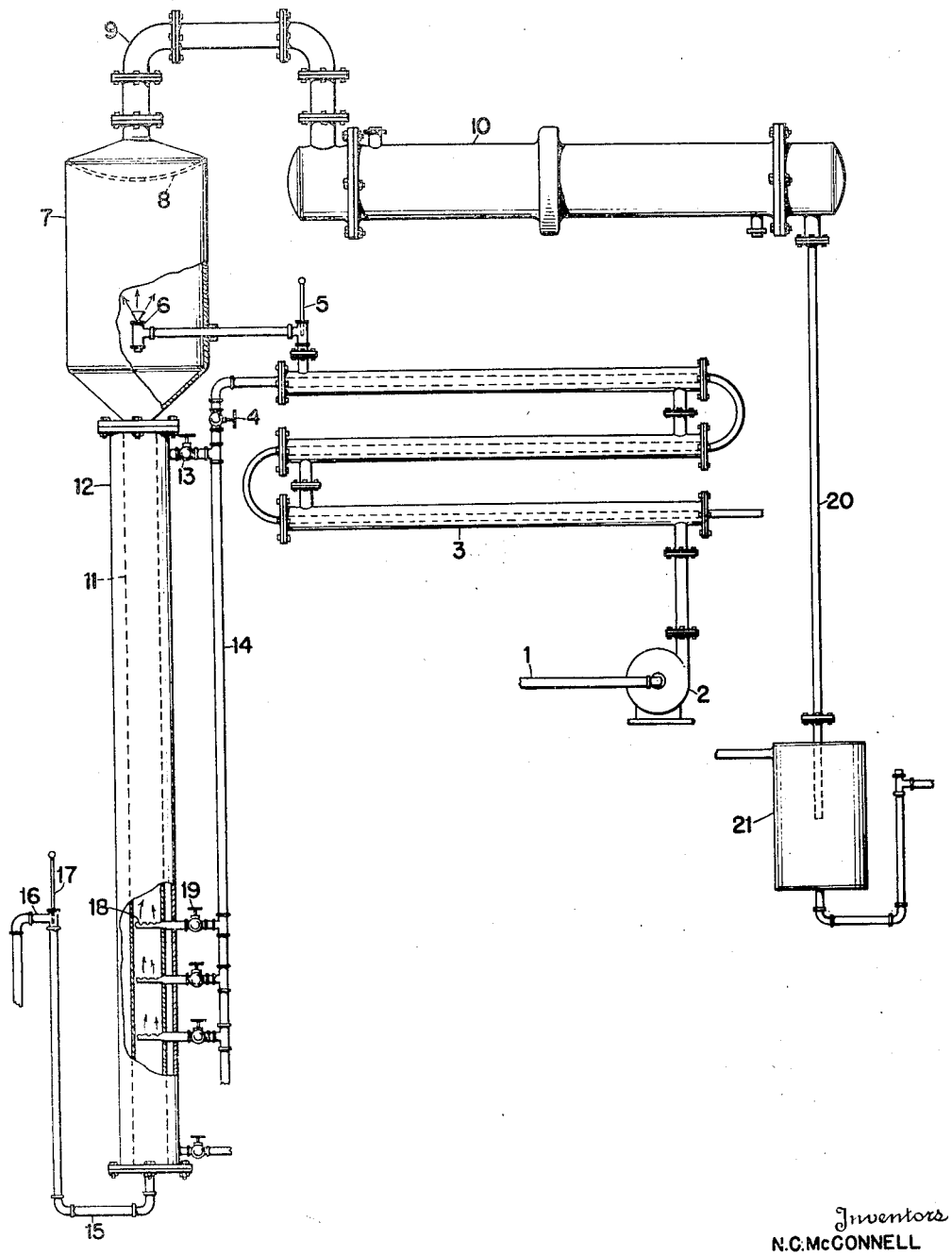

2,500,194

UNITED STATES PATENT OFFICE 2,500,194

FLASH DISTILLATION OF TURPENTINE

Nealy C. McConnell, Olustee, Lawrence W. Mims, Gainesville, Harry P. Poole, Lake City, and Hubert R. Lanier, Olustee, Fla., assignors to the United States of America as represented by the Secretary of Agriculture Application June 25, 1946, Serial No. 679,052

2 Claims. (Cl. 202—46)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a new and improved process for the flash distillation of turpentine, together with an arrangement of apparatus for conducting this process.

Gum turpentine is obtained from the oleoresin which exudes from the living southern pine. This oleoresin ordinarily contains approximately 20 to 23 percent turpentine and approximately 73 to 76 percent rosin, the balance being water, bark, trash, and so forth. The customary procedure for recovering turpentine from oleoresin is to charge a batch of the oleoresin into a simple pot still; apply heat either by means of a fire under the still or by means of steam in closed coils and/or open jets; and thus, distill off the turpentine. The turpentine vapors are condensed, together with the water vapor if steam is used, in a suitable condenser or "worm," thus yielding the ordinary gum turpentine of commerce. The distillation of each batch is continued until a test shows that substantially no more turpentine is coming over; then the residual rosin is run out and the still is charged with another batch of oleoresin.

In the most modern naval stores plants, the oleoresin is diluted with additional turpentine to increase the turpentine content to about 30 to 40 percent and thereby lower the specific gravity to less than 1.0. This diluted oleoresin is then filtered to remove chips, twigs, dirt, and trash of all kinds, and is then washed with water, in accordance with United States Patent No. 2,254,785. After the wash water has settled out it is drawn off, and the cleaned, diluted gum is then ready for distillation. As in the case of the crude oleoresin, it is customary throughout the naval stores industry to distill this cleaned, diluted gum in batch steam stills.

We have discovered that, by the use of a suitable arrangement of apparatus, we can recover the turpentine from oleroresin by flash distillation. It therefore is an object of this invention to provide a means of recovering turpentine from preheated, cleaned, and diluted oleoresin by flash distillation. Such a distillation requires less than half as much heat per unit of gum as does the conventional batch distillation in a pot still. Another object of our invention is to provide simple apparatus for the continuous flash distillation of turpentine, thus overcoming the difficulties and disadvantages of intermittent or batch distillation. It is known to distill turpentine under a vacuum using evaporators of various types connected to pumps, or jets, to maintain a vacuum in the system. It is an object of our invention to provide a means of distilling turpentine at substantially atmospheric pressure without the use of vacuum.

It is to be noted that, in all distillations of pine gum by batch processes, either in a fire still or in a steam still, at least a part of the turpentine undergoes prolonged heating in intimate contact with rosin. It is known that heating beta-pinene in the presence of organic acids, including rosin acids, isomerizes it into alpha-pinene. (See Austerweil, Bulletin de la Société Chimique de France 39, 696, 1926.) Since beta-pinene constitutes approximately 30 percent of gum turpentine, it is obvious that when the turpentine is distilled from the rosin in a batch distillation process, some of the beta-pinene will be isomerized into alpha-pinene. In our flash distillation process, however, when it is operated continuously, most of the turpentine is removed from contact with the rosin almost instantly, and the time of contact between any beta-pinene and rosin is reduced to only a few minutes at most. The result is that the isomerization of the beta-pinene is reduced to a minimum. It therefore is a further object of our invention to provide a means of producing a gum turpentine containing a maximum percentage of beta-pinene. This is definitely advantageous when the turpentine is to be used as the basic material in certain polymerization reactions, for example, in the production of various synthetic resins.

Through extensive experimental work, we have found that the apparatus described below is highly satisfactory for the flash distillation of turpentine. The essential parts of the apparatus are as follows: A pump of conventional design for forcing the cleaned and diluted oleoresin through the heat-exchanger into the flash chamber and maintaining a suitable pressure at the spray nozzle in the flash chamber; a heat-exchanger, or preheater, of conventional design in which the cleaned and diluted oleoresin is heated to the desired temperature by means of steam under pressure; a spray nozzle of conventional design, which preferably, though not necessarily, produces a "hollow cone" spray through which the preheated gum is forced; this spray nozzle is supported inside of a flash chamber of sufficient size to permit the "flashing," or almost instantaneous evaporation, of the turpentine as it leaves the spray nozzle; the top outlet from the flash chamber is connected to a suitable condenser of conventional design in which the turpentine vapors and steam are condensed; below the flash chamber and connected directly to it is a steam-jacketed "stripping" column in which the descending rosin is met by an ascending current of jet steam which strips the residual turpentine out of the rosin; and finally, there is a holding chamber, or dehydrating section, in which the rosin is heated by means of steam in closed coils or in a jacket, or both, and any moisture in the rosin is volatilized, leaving substantially dry molten rosin which flows out into suitable receivers such as tanks, or drums.

One preferred embodiment of our invention is illustrated in the accompanying drawing, which is diagrammatic only and is not intended to limit the invention to this particular arrangement of piping, valves, and other apparatus.

The cleaned, diluted gum, or solution of rosin in turpentine, enters pump 2 through pipe 1 and is forced through a heat-exchanger 3 of conventional design, such as, for example, the finned-tube type. By means of steam entering the heat-exchanger through valve 4 from steam header 14, the gum is heated to a temperature of, say 300° to 350° F. as shown by thermometer 5. Due to the pressure exerted by pump 2, the preheated gum is forced through spray nozzle 6 and sprays out into flash chamber 7. This flash chamber is preferably, though not necessarily, constructed with one or more baffle plates 8. Because of the sudden reduction in pressure, a large proportion, in some cases as much as five-sixths, of the turpentine in the gum vaporizes or "flashes" off in the flash chamber. This turpentine vapor leaves the flash chamber through outlet pipe 9 and is condensed in a condenser 10 of conventional design.

The droplets of rosin remaining in the flash chamber after the vaporization of most of the turpentine fall by gravity and coalesce to a fluid film which flows down out of the flash chamber into a pipe 11 which serves as a stripping column. This pipe is surrounded by a steam jacket 12 in which steam is maintained under pressure. The steam is admitted to the jacket through valve 13 from steam header 14. The rosin flows out of the stripping column through outlet pipe 15 and rises to overflow pipe 16. The temperature of the rosin is measured by thermometer 17. This overflow pipe is preferably, though not necessarily, at a point up about one-third the distance from the bottom to the top of the stripping column 11. The effect of this arrangement is that the lower one-third of the column is full of molten rosin. A plurality of steam jets or sparger pipes 18 is arranged in this section of the stripping column. They can be arranged in any convenient manner, but it is preferred that the topmost sparger pipe be no higher than the overflow pipe 16. Steam is admitted to these sparger pipes from the steam header 14 through valves 19. The steam comes into intimate contact with the liquid rosin, and as it rises through the stripping column, it meets the descending rosin and vaporizes the residual turpentine present therein. The resulting mixture of steam and turpentine vapor rises through the flash chamber 7 and is condensed in the condenser 10, together with the main portion of the turpentine vapors from the flash distillation. The mixture of liquid turpentine and water flows out of the condenser through pipe 20 to a separator tank 21, where a gravity separation of the turpentine and the water takes place.

The lower end of the stripping column 11 below the lowest sparger pipe acts as a dehydrating chamber, and any droplets of water that may be present in the rosin rise into the agitated section around the sparger pipes. The rosin at the bottom of the column thus becomes clear and practically moisture-free. Due to the continuous flow of rosin down the column, it is forced to flow out through the overflow pipe 16, and is collected in drums or other suitable containers.

The following examples illustrate the operation of our invention. In this particular flash still, the flash chamber 7 was 25 inches in diameter by 30 inches high on the straight side. The stripping column 11 consisted of a piece of standard pipe 6 inches in diameter by 15 feet long, steam jacketed throughout its entire length. The overflow pipe 16 was 5 feet above the bottom end of the stripping column. It is to be understood that the details of construction can vary widely without departing from the essential spirit of the invention, and it is also to be understood that the examples, which follow, are for the purpose of illustration only.

*Example I*

A batch of pine oleoresin was diluted with turpentine, filtered, washed with water, and allowed to settle. On analysis, it showed 65.6 percent rosin, 33.0 percent turpentine, and 1.4 percent water. Steam was maintained on the jacket of the still at 170 p. s. i., and in the preheater at the same pressure. The oleoresin solution was pumped through the preheater at such a rate that the thermometer 5 read approximately 330° F. Steam was admitted to the two top spargers 18 through valves 19. As soon as the rosin began to flow out of the overflow pipe 16, a measured run was made in which the condensed steam from the steam jacket 12, from the preheater 3, and from the separator 21, was all collected and measured. During 25 minutes, total oleoresin pumped through was 813 pounds, and the total steam condensed during the same time amounted to 346 pounds. This is equivalent to throughput of 1,950 pounds of oleoresin per hour, with a total steam consumption of 0.426 pound per pound of oleoresin. The turpentine recovered was clean and "waterwhite" and showed no entrained rosin. The rosin recovered was clean and bright and showed no indication of residual moisture. On analysis, the rosin showed only 0.5 percent residual turpentine, which is lower than most commercial gum rosins.

*Example II*

Another batch of cleaned oleoresin (analysis 62.2 percent rosin, 34.9 percent turpentine, 2.9 percent water) was pumped through the flash distillation apparatus, as described in Example I, except that the steam pressure was maintained at 150 p. s. i. In 26 minutes, 731 pounds of oleoresin were pumped through, and the total steam condensed during the same time amounted to 340 pounds. This is equivalent to a throughput of 1,685 pounds of oleoresin per hour at an overall steam consumption of 0.464 pound per pound of oleoresin. The turpentine recovered was free from entrained rosin, and the rosin obtained was free from moisture and showed only 1.0 percent residual turpentine.

Example III

Another batch of cleaned oleoresin (analysis 66.4 percent rosin, 33.5 percent turpentine, 0.1 percent water) was pumped through the flash distillation apparatus as described in Example I, except that the steam pressure was maintained at 120 p. s. i. In 27 minutes, 553 pounds of oleoresin were pumped through and the total steam condensed amounted to 254 pounds. This is equivalent to a throughput of 1,225 pounds of oleoresin per hour at an over-all steam consumption of 0.460 pound steam per pound of oleoresin. As before, the turpentine recovered was free from entrained rosin, and the rosin obtained was free from moisture and showed only 0.6 percent residual turpentine.

Having thus described our invention, we claim:

1. A flash distillation apparatus for separating turpentine and dry rosin from oleoresin, comprising an upper flash chamber and an elongated lower stripping tower, a spray nozzle in the flash chamber, a turpentine vapor outlet in the upper part of the flash chamber, an outlet for rosin in the lower part of the stripping tower, the flash chamber having a lower outlet superposed over an upper inlet of the stripping tower, a heating jacket about the stripping tower extending downwardly to the lower end of the stripping tower, two or more longitudinally spaced perforated steam inlet pipes communicating with and extending into the interior of the lower part of the jacketed stripping tower, the lowermost steam inlet pipe being above the lower end of the jacket of the stripping tower, and a liquid seal overflow control conduit connected to the lower end of the stripping tower to maintain a body of liquid rosin in the lower part of said tower and at a level at least above one of said steam inlet pipes, the jacketed section below the steam inlet pipes serving as a rosin dehydrating chamber.

2. A continuous single stage one pass process of distilling a gum turpentine from oleoresin with a minimum time of contact between the beta-pinene and the rosin acids and consequent minimum conversion to alpha-pinene, comprising diluting the oleoresin with turpentine, preheating the diluted oleoresin under pressure to about 300° to 500° F., spraying the so preheated liquid into a flashing zone wherein the pressure on the hot liquid oleoresin is released and a major amount of the turpentine is immediately vaporized, removing the said major amount of turpentine from the flashing zone to separate it from the rosin descending in said zone, causing said rosin, accompanied by only a minor amount of the original turpentine, to descend into a stripping zone through an ascending current of steam, maintaining a hot body of the separated liquid rosin in the lower part of the stripping zone, introducing steam under pressure below the surface of the hot body of liquid rosin to distill water and turpentine therefrom, said steam thereafter ascending as aforesaid, the steam being introduced only into the upper part of the body of liquid rosin, the lower end of the body of liquid rosin serving as a quiescent dehydrating zone, heating the quiescent zone, droplets of water present therein rising into the steam-agitated section above, continuously removing clear and substantially moisture-free rosin from the lower part of said zone.

NEALY C. McCONNELL.
LAWRENCE W. MIMS.
HARRY P. POOLE.
HUBERT R. LANIER.

REFERENCES CITED

The following references are of record in the file of this patent:

UNITED STATES PATENTS

| Number | Name | Date |
|---|---|---|
| 115,429 | Burcey | May 30, 1871 |
| 179,960 | Rock | July 18, 1876 |
| 374,077 | Mathieu | Nov. 29, 1887 |
| 1,162,036 | Chase et al. | Nov. 30, 1915 |
| 1,881,718 | Lawrie | Oct. 11, 1932 |
| 1,904,464 | Hitch | Apr. 18, 1933 |
| 1,916,104 | French | June 27, 1933 |
| 2,042,713 | Gray | June 2, 1936 |
| 2,363,692 | Reed | Nov. 28, 1944 |